United States Patent Office 3,298,999
Patented Jan. 17, 1967

3,298,999
CURING EPOXY RESINS WITH CHELATED O-METHYLOL PHENOLIC COMPOUNDS OR RESINS
Shigeru Kiriyama, 123–1 Tsushimae, Neyagawa-shi, Osaka-fu, Japan; Nobuyoshi Mabuchi, 15 Kyuoobayonban, Ooaza-Dainichi, Moriguchi-shi, Osaka-fu, Japan; and Masahiro Sakai, Motofumi Yoshida, Susumu Okamoto, and Harumitsu Ikeda, 434 Niwaji, Neyagawa-shi, Osaka-fu, Japan
No Drawing. Filed Dec. 18, 1962, Ser. No. 245,407
Claims priority, application Japan, Dec. 21, 1961, 36/46,222, 36/46,223, 36/46,224, 36/46,225
18 Claims. (Cl. 260—47)

This invention relates to a metal-containing heat resistant epoxy resin and more particularly to the use of a metal chelated phenol-formaldehyde resin as reaction material or as a hardening agent.

It is well known that epoxy resins are thermosetting resins and become hard and infusible when converted by a hardening agent and further that hardened epoxy resins are approximately seven times tougher than phenolic resins. In addition, epoxy resins have many valuable properties, such as specific characteristics according to selected hardening condition, high adhesive force arising from the polarity of aliphatic hydroxyl

and ether (C—O—C) groups present in the initial resin chain or the hardened system, and good chemical resistance as they are very inert chemically after hardening, etc. This has resulted in their widespread use in many industries as paints, adhesives, sealing liquids, laminates, casting materials, reinforced plastics, etc. Consequently, their consumption has shown a yearly increase. It is an especially important problem for the castings and adhesives fields to improve the heat resistant properties.

Generally, epoxy resins are made of polyhydric phenol, such as bisphenol, and halohydrin such as epichlorhydrin, and they have high reactivity and ability to react at room temperatures. Epoxy resins heretofore available have excellent adhesive properties owing to the existence of the chemical reactive point represented by epoxy or ethoxyline groups in this formula, but, do not provide suitable resistance when subjected to high temperatures.

The inventors have prepared novel epoxy resins which have excellent properties, such as heat resistance, etc., by using metal chelated phenol-formaldehyde resin as reaction materials and new hardening agents.

The invention has the following characteristics. The first characteristic is that the hardened materials have improved properties resulting from the use of chelated phenolic resin, prepared by reacting o-methylol-phenol with metallic ions in the presence of alkali as a hardener of epoxy resins. The chelated phenolic resins are very compatible with epoxy resins and can be used in the formulation of baking-type paints, heat resistant adhesives, potting and casting materials by adding them as hardener to epoxy resins.

The second characteristic is the manufacturing of novel metal-containing epoxy resins by using the chelated phenolic resin as reaction materials, that is, reacting the chelated phenolic resin with epihalohydrin and the like. These metal-containing epoxy resins are able to be hardened by several organic amines in the same manner as ordinary epoxy resins are hardened.

Many recent spectrophotometric studies have made it obvious that orthomethylol phenols chelate with metallic ion in aqueous solution or organic solvent and produce a color dependent on the metallic ion present. When $1/n$ mols of polybasic metal aqueous solution is dropped with violent stirring at room temperature into an alkali salt aqueous solution of phenol (which is prepared by adding one mol of phenolic derivatives having one or two methylol radicals in the ortho position, to the aqueous solution containing 1 mol of alkali) the chelated compound is formed with coloring or precipitating. When X is the number of coordinated o-methylol groups, the structure of the chelated compound formed is as follows:

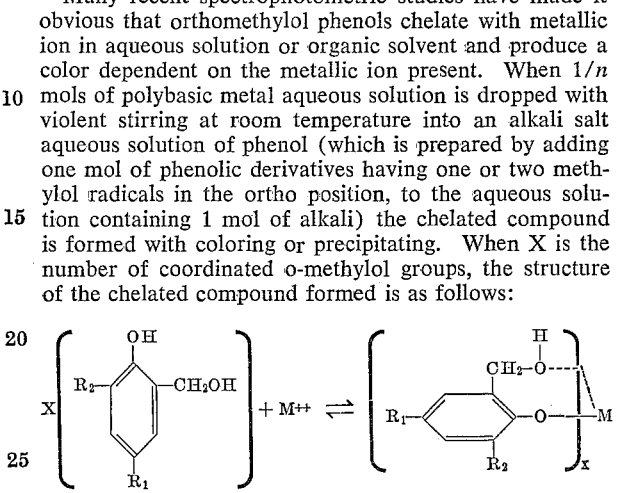

With divalent metallic ions the product is as follows:

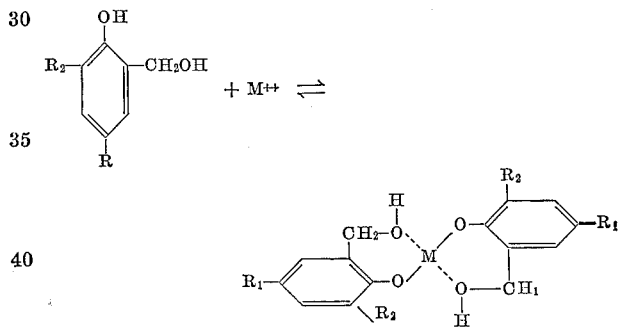

Similar reactions occur with metals whose coordination numbers are six or eight. Therefore, the metals which may be used are those contained in the second to eighth groups in the Periodic Tables. Of course, it is necessary that these metal salts are soluble in water and organic solvent and experience ionic dissociation in alkali salt aqueous solution of methylol phenols. As the salts of the metals, inorganic salts such as nitrate, sulfate, phosphate, chloride, and organic acid salts such as acetate, oxalate, etc., may be used. As phenols, non-substituted phenols and mono-ortho or para-substituted phenols substituted with any of the following inorganic, aliphatic (saturated or unsaturated) or aromatic groups such as nitro-, sulfonic-, amino-, halogen, methyl, ethyl, butyl, allyl, aryl may be used. However, in many cases we obtained good results by using para-substituted phenols.

As the compounds chelated by the above mentioned method, the o-methylol compounds synthesized from said various phenols are insoluble or less soluble in water in many cases and powdered chelated materials are obtained by water-wash and drying (100–120° C.) the precipitate after filter separation. These chelated materials having strong reactivity with epoxy resin which cannot be obtained from ordinary o-methylol phenol. This is because said chelated materials have two activated hydrogen atoms arising from chelating of methylolic OH. And for this reason, such chelated materials will harden epoxy resin. Moreover, the chelated phenolic resins are easily soluble in organic solvent or epoxy resin in spite of being infusible or only slightly fusible at even 200° C. For example, these are soluble about 40 p.h.r. at heating in commercial liquid epoxy resin Araldite 6600 (epoxy resin product of Ciba Co., Ltd., produced from bisphenol and epichlorhydrin). Therefore, the chelated phenolic resins can be used advantageously as a hardener of commercial epoxy resins. For example, colored oily composition made by mixing 100 parts of Araldite 6600 and 10–70 parts of powder chelated compounds becomes a completely transparent homogeneous material when heated and then turns to an excellent heat resistant hardened material that cannot be obtained in hardened material using acid anhydride or amino-derivatives as hardeners.

The mixed composition made by adding chelated phenolic resin in various epoxy resins as hardeners can be used as adhesives, casting and potting materials or epoxy paints by dissolving with some organic solvent, and possess excellent properties. For instance, as described in the examples which follow, the compositions possessed outstanding heat resistance at a heat-proof-cycle of 200° C.– –60° C. and had excellent adhesive forces at room temperature which were not lowered even at 180° C. Good properties are exhibited by hardened casting or molded products. In epoxy coating, it is well known that the use of phenolic resins as hardeners generally produces a hard film having good heat and chemical resistance. However, its great defect has been that the film was too brittle for bending.

The hardened film obtained by using the chelated phenolic resins as the hardener, has not only better heat and chemical resistant properties than films obtained by using other phenolic resins, but is also hard and is extremely bendable and flexible.

These chelated phenolic resin-epoxy resin mixed compositions can be used advantageously for the same uses as ordinary epoxy resins have been used and they possess excellent properties according to expected use, because the metal is introduced in its hardened substance by compounding metal chelated phenolic resin as hardener to general epoxy resins.

As shown in Examples 1 to 3, we can separate o-methylol phenol by reaction of phenol and formaldehyde at relatively low temperature for a long period of time, but by reacting phenol and formaldehyde at relatively high temperature in presence of an alkali catalyser, a so-called resol type resin with oily state and a high degree of condensation is produced. As this resol type resin has non-condensed methylol radical in both or one end, so various metal chelated resol type phenolic resins can be prepared by this method. The reaction of this methylol material (so-called resol type resin) and metallic ion can be described as follows:

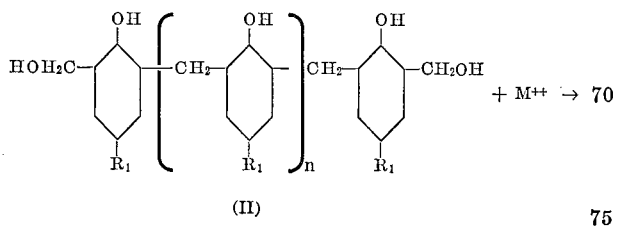

(II)

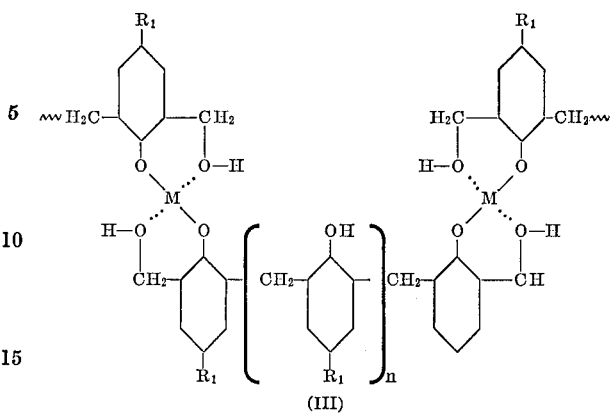

(III)

We can obtain Compound V by reacting with phenol as follows, when $R_2$ is methylol in the chelated Compound I in the case (IV).

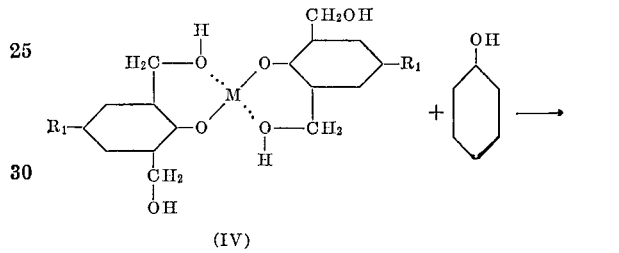

(IV)

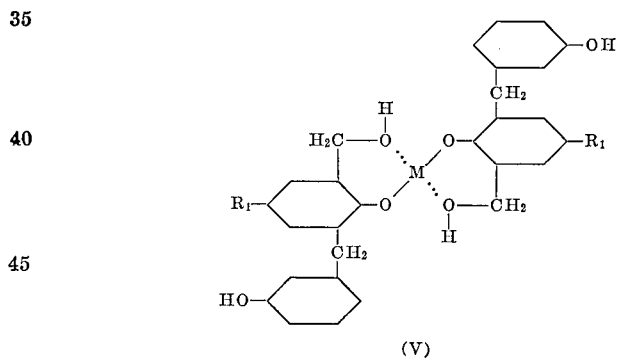

(V)

As having phenolic OH in chelated molecules, both compounds represented by (III) and (V) can be glycidylated with epihalohydrine or dihalohydrine by the usual method. That is: 100 parts of the Compound III or V and between 100 and 200 parts of epihalohydrine are mixed and 40% aqueous solution of required amounts of alkali are dropped at a reaction temperature 20–100° C., preferably 60–75° C. Required alkali amounts are determined by calculation theoretically for the Compound V, and using measured quantity from titration curve previously prepared by relation of pH and alkali amounts of addition for the Compound III. The white precipitate of sodium halide is produced simultaneously with the dropping of alkali. After dropping, the contents are agitated for an additional 20–40 minutes, cooled, washed with water and the excess epihalohydrin is distilled off, whereby the metal chelated epoxy resin is obtained.

By this method, the novel epoxy resins containing various metals in chelated state can be prepared by using various phenols, having inorganic, aliphatic (saturated or unsaturated) or aromatic groups such as $R_1$ is H, nitro-, sulfonic-, amino-, methyl-, ethyl-, butyl-, allyl-, aryl-, etc., as raw materials.

Reaction formula in these cases are as follows:

(III) 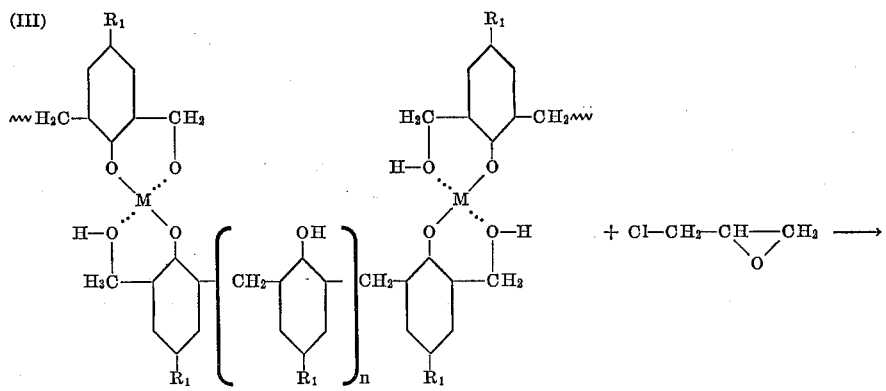

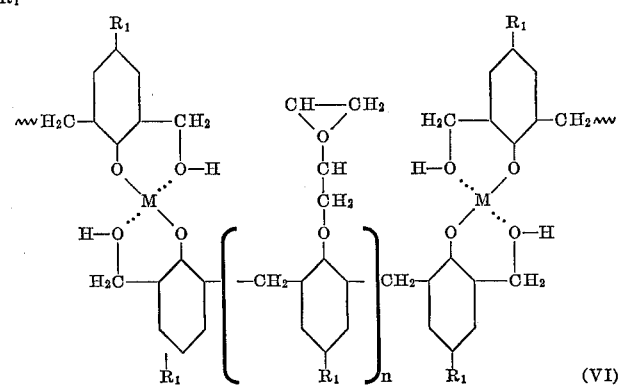

(VI)

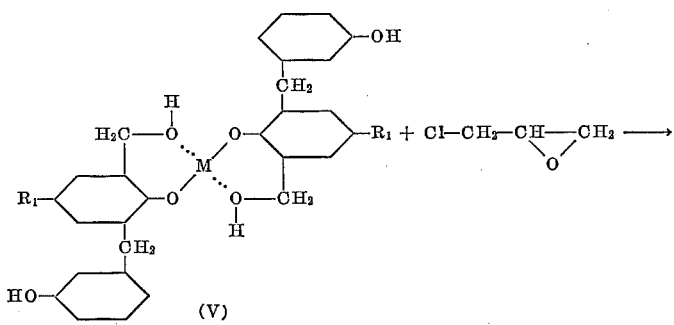

(V)

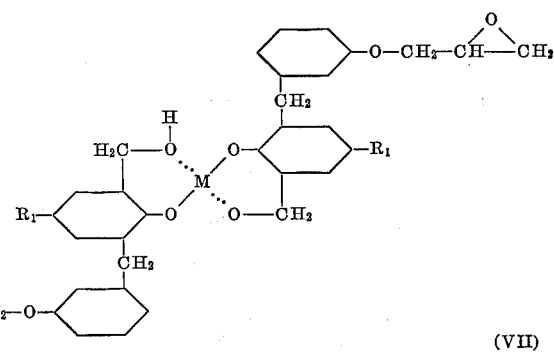

(VII)

In the case of chelated Compound I or IV not having phenolic OH in its molecules, the glycidyl radical can be introduced by reacting with epihalohydrin in the presence of an amine catalyst, to prepare halohydrin and closing its ring with an alkali. That is: from 100 to 200 parts of epihalohydrin are added to 100 parts of the chelated Compound I or IV, then 0.5 to 3% by weight of a tertiary amine is added and the mixture is reacted at 60 to 100° C. for 1 to 5 hours. After the reaction, the contents are held at a temperature between 40 to 100° C., preferably 60 to 75° C., and calculated amounts of 40% caustic alkali aqueous solution are dropped slowly with violent stirring to produce sodium halide precipitation simultaneously with dropping. After cooling and washing with water, the excess epihalohydrin is removed by vacuum distillation to obtain the chelated epoxy resin (IX).

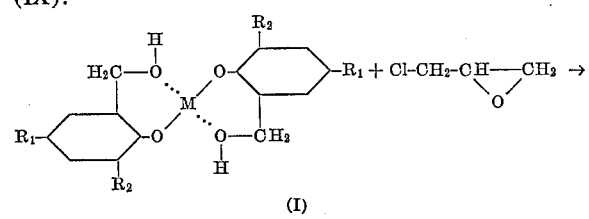

(I)

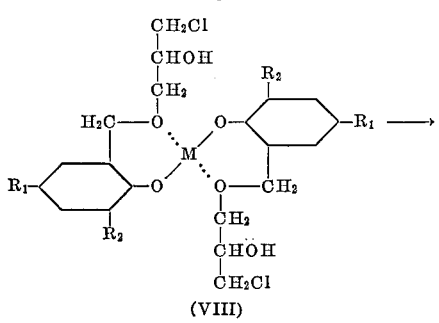

(VIII)

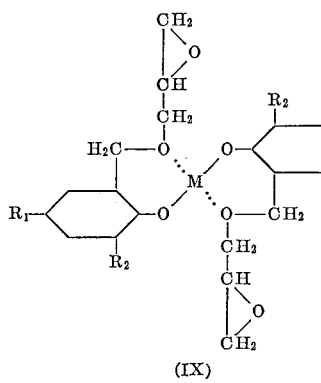

(IX)

The metal-containing epoxy resin prepared by this method, having activated hydrogen arisen from chelated or non-chelated OH at the end of the chain, cause a cross-linking reaction with usual epoxy resin hardeners such as aromatic or aliphatic amines, polyamides, or carboxylic acid anhydrides to become hardened material with excellent heat resistance. The novel epoxy resins obtained by this invention may possess individual tints dependent on the specific metals introduced, but they exhibit good resistance to chemicals, rubbing, heat, etc. These resins can be used in the general fields of adhesives, paints, casting or moulding materials, electric industries, etc., and can be advantageously applied as sealing liquids, lining materials, special adhesives, reinforced plastic and the like, requiring high heat resistance.

The invention will be more fully understood by reference to several particular embodiments of the invention as shown in the following examples:

Example 1

38.8 grams (0.2 mol) of 2-methyl-4t-butyl-6-methylol phenol were dissolved in a solution prepared by dissolving 8 grams of NaOH in 100 cc. of water. Then 500 cc. of 0.4 N zinc chloride aqueous solution were dropped in this mixture at room temperature with violent stirring. After reaction, the produced precipitates were filtered, washed and dried to obtain Zn-chelated compound. The product is the compound in Formula I above, in which $R_1$ is t-butyl group and $R_2$ is methyl group. 100 parts of Araldite 6600 and 70 parts of this chelated compound were mixed thoroughly at 100–120° C. and coated in 12 mm. widths on soft iron sheets of 2 x 25 x 100 mm., which were then placed in a pile. After heating at 180° C. for 30 minutes to harden the resin and join the sheets, the product showed the following adhesive strength as compared with metal-free adhesive prepared by mixing 100 parts of Araldite 6600 and 70 parts of non-chelated metal free phenol resin.

TABLE I

Adhesive strength kg./cm.$^2$

Metal-free _____ 80
Zn-chelated _____ 120

This chelated compound and Araldite 6071 (product of Ciba Co., Ltd. and the condensation product of epichlorhydrin and bisphenol) were combined to make a paint. By baking at the temperature of 180–200° C. for 30 minutes an excellent paint film having the following properties was obtained:

TABLE II

Hardness (Sward rocker value) _____ 40–45
Rub resistance, l./10μ _____ 50–65
Gloss _____ 112–116
Light fastness _____ Good
Erichsen test, mm. _____ 7–8

Example 2

1.52 grams (0.01 mol) of 2,4-dimethyl-6-methylol-phenol were dissolved in an aqueous solution prepared by mixing 0.4 gram (0.01 mol) of caustic soda and 50 cc. of water, and then with violent stirring 50 cc. of 0.2 N zinc chloride solution were dropped into the resulting solution. The precipitate was filtered, washed and dried to obtain the chelated compound. This compound is that shown in Formula I with methyl groups as $R_1$ and $R_2$.

It showed adhesive strengths of 160 kg./cm.$^2$ when used to formulate adhesives with Araldite 6600, as described in Example 1.

Example 3

21 grams (0.1 mol) of 2,6-dimethylol-4t-butylphenol were dissolved in 100 cc. of aqueous solution containing 4 grams (0.1 mol) of caustic soda, and then while violently stirring, 500 cc. of 0.1 N zinc chloride aqueous solution were dropped into the solution. The precipitate was filtered, washed and dried to obtain the chelated compound shown in Formula I having methylol radical in the $R_2$ position and t-butyl radical in the $R_1$ position.

The weight decrease caused by heating at 200° C. of hardened substance prepared by combining Araldite 6600 and various chelated compounds, prepared by the same method using salts of various metals such as Fe, Mg, Al, Cr, etc., is as shown in the following Table III. (Hardening condition: 180° C., 30 minutes, 200° C., 20 hours.)

TABLE III

| Metal: | Percent of decreased weight after heating at 200° C. for 24 hours |
|---|---|
| Fe++ | 0.40 |
| Fe+++ | 0.72 |
| Ti | 0.93 |
| Mg | 0.51 |
| Al | 0.83 |
| Cr | 0.64 |
| Zn | 0.52 |

These chelated compounds were added to Araldite 6600 as hardening agents to make adhesives. The strength of these adhesives when coated in 12 mm. width as in Example 1, and hardened at 180° C. for 30 minutes was as follows:

TABLE IV

| Metal | Adhesive Strength, kg./cm.$^2$ | |
|---|---|---|
| | Room Temperature | 180° C. |
| Mg | 143 | 120 |
| Co | 152 | 155 |
| Zn | 300 | 320 |
| Mn | 215 | 180 |
| Cn | 132 | 140 |
| Ba | 186 | 160 |
| Cd | 124 | 120 |
| Ti | 196 | 180 |

As shown in the above table, Zn-chelate had the strongest adhesive force among these metals. When the test pieces adhered by using Zn-chelated compound as the hardening agent were tested in a cycle of heating—coolings maintained first at 200° C. for 30 minutes, next at −60° C. for 30 minutes, it showed extremely good heat stability and the change in adhesive strength was as follows:

TABLE V

Heat resistant cyclic properties of adhesive strength (200° C. and −60° C.) kg./cm.$^2$

| Number of cycles: | |
|---|---|
| 0 | 300 |
| 1 | 280 |
| 2 | 260 |
| 3 | 290 |
| 4 | 280 |
| 5 | 270 |
| 6 | 290 |
| 7 | 290 |
| 8 | 310 |
| 9 | 280 |
| 10 | 280 |

We obtained excellent coated films as shown in the following table when Zn-chelate was combined with Araldite 6071 to make paint and baked at 180° C. for 30 minutes.

TABLE VI

| | |
|---|---|
| Hardness (Sward rocker value) | 40–50 |
| Rub resistance, 1./10μ | 60–70 |
| Gloss | 114–115 |
| Scotch tape test | Good |
| Bending test | Good |
| Light fastness | Good |

*Example 4*

94 grams (1 mol) phenol and 162 grams (36%) formaline and 2 cc. of 5 N aqueous NaOH were mixed and reacted at 60–70° C. for 1–2 hours. An alkali solution prepared by dissolving 40 grams of caustic soda in 500 cc. of water was then added. Then a ferric chloride solution prepared by dissolving 99 grams of ferric chloride in 500 cc. of water was dropped into the solution with violent stirring. A black violet colored oily precipitate was produced and solidified after being left for one day and night, then was pulverized. Compositions were made using said chelated phenolic resin as a hardener of Araldite 6071, and were found to be excellent baking type paints. The properties of painted films were as follows:

TABLE VII

| | |
|---|---|
| Hardness (Sward rocker values) | 40–50 |
| Rub resistance, 1./10μ | 50–60 |
| Gloss | 100–110 |
| Scotch tape test | Good |
| Bending test | Good |
| Light fastness | Good |

*Example 5*

A solution prepared by dissolving 15 grams (0.1 mol) of p-t-butyl-phenol and 4 grams of caustic soda and 16.5 grams of 36% formalin in 36 grams of water. The mixture was reacted at 40–80° C. for 2–3 hours to obtain a light yellow colored opaque oily substance. Then, the products were cooled and by the addition of 300 cc. water were converted to a uniform solution. Subsequently, 6.8 grams zinc chloride were dissolved in 30 grams water at 20–30° C., and the solution was dropped into the uniform solution while violently stirring. The precipitate produced simultaneously with dropping was filtered and dried. A composition prepared by combining Araldite 6071 and the obtained chelated compound as a hardener was found to be an excellent paint as in Example 4. Properties of the paint film after baking at 180° C. for 30 minutes are as follows:

TABLE VIII

| | |
|---|---|
| Hardness | 40–50 |
| Rub resistance, 1./10μ | 50–60 |
| Gloss | 110–115 |
| Scotch tape test | Good |
| Bending test | Good |
| Light fastness | Good |

*Example 6*

100 parts of the chelated resol type phenol formaldehyde resin obtained by Example 5 were dissolved in 150 parts of epichlorhydrin, to which 40% aqueous solution of the previously calculated (from titration curve) amounts of caustic soda were dropped at 80° C. with violent agitation. After reaction, the produced material was washed and excess epihalohydrin was removed by distillation and the epoxidized chelated resin was obtained in an oily state on heating. This resin could be hardened by organic amines.

*Example 7*

4–6 parts of phenylenediamine were added to 100 parts of the metal-containing glycidyl derivatives obtained in Example 6 and the mixture was heated at 100–120° C. A uniform oily mixture was obtained. The hardened material, obtained by heating this mixture at 160° C. for 3 hours, and then at 180° C. for 2 hours, possessed the physical properties stated in the following table:

TABLE IX

| (kg./cm.$^2$) | Room Temperature | 160° C. |
|---|---|---|
| Compression strength | 1,000–1,500 | 800–1,200 |
| Tensile strength | 600–900 | 500–850 |
| Bending strength | 980–1,400 | 750–1,000 |
| Adhesive Strength | 200–250 | 230–300 |

Normal temperature hardening type paints can be made heat resistant by adding aliphatic amines solution to the metal chelated glycidyl derivatives solution obtained as above described.

*Example 8*

A mixture of 100 grams of 50% glycidyl derivatives solution prepared by dissolving the glycidyl derivative of Example 7 in the mixed solvent of 40 parts methylisobutylketone, 20 parts butyl Cellosolve and 40 parts butyl acetate, and 100 grams of 5% triethylene tetramine solution prepared by dissolving in the mixed solvent of 80 parts methylisobutylketone and 40 parts butyl Cellosolve, gave a paint film applied by brush or spray coating having excellent gloss, and heat and chemical resistance.

TABLE X

| | |
|---|---|
| Hardness (Sward rocker value) | 50–55 |
| Gloss | 110–120 |
| Rub resistance, 1./10μ | 60–65 |
| Scotch tape test | Good |
| Bending test | Good |
| Light fastness | Good |

Chemical resistance:

| Chemicals | Period | Temperature | Result |
|---|---|---|---|
| Acetone | Three month | Room temp. | No change. |
| MIBK | do | do | Do. |
| 70% H$_2$SO$_4$ | do | do | Do. |
| 10% NaOH | do | do | Do. |

The results compared to a similar paint made by the same method using metal free glycidyl derivatives were as follows:

TABLE XI

|  | Metal contained | Metal free |
|---|---|---|
| Rub resistance | 50–65 l./10μ | 30–40 l./10μ. |
| Scotch tape test | Good | Good. |
| Shock resistance | do | Not good. |
| Hardness (Sward rocker value) | 40–50 | 30–40. |
| Gloss | 110–140 | 90–110. |
| Bending test | Good | Not good. |
| Accelerated weathering proofness | Almost good | Good. |

It will be evident that the metal-containing epoxy resin paint according to this invention has remarkably improved properties as compared to conventional resin paints.

*Example 9*

0.1 mol of the chelated Compound IV prepared by Example 3 and 75.2 grams (0.8 mol) phenol were poured into a three necked flask and reacted at 60–80° C. for five hours. Then the contents were poured into 200 cc. of hot water and the oily part was separated by decantation. The excess phenol was removed by repeating this separation three times to obtain Compound V. 184 grams (2 mols) of epichlorhydrin were mixed with 0.1 mol the above Compound V and then 20 grams of 40% caustic soda aqueous solution were dropped into the mixture at 50–60° C. while violently stirring. Sodium chloride was precipitated simultaneously with dropping. After dropping the contents were washed, dried and the excess epichlorhydrin was distilled out to obtain a semi-solid substance with light brown color. The resulting substance hardened with phenylenediamine as in Example 8 showed the following physical properties:

TABLE XII

|  | Room Temperature | Heating (160° C.) |
|---|---|---|
| Compression strength (kg./cm.²) | 900–1,300 | 800–1,200 |
| Tensile strength (kg./cm.²) | 600–1,000 | 600–900 |
| Adhesive strength (kg./cm.²) | 250–280 | 260–290 |

*Example 10*

The zinc chelate obtained by Example 3 was glycidylated as follows: 150 parts of epichlorhydrin were added to 100 parts of chelated substance, then 0.5–5 parts of tertiary amine (for example, dimethyl benzylamine) were added. This mixture was reacted at 60–80° C. for 2 to 5 hours. Next, an alkali solution prepared with 84 parts of caustic soda and 100 cc. of water was dropped into the reacted mixture to produce sodium chloride simultaneously with dropping. After dropping the reaction was continued for 20 to 30 minutes at constant temperature with stirring and then stopped. The reaction product was washed with water and the excess epichlorhydrin was distilled from the product to obtain oily substance, which solidified after cooling. When phenylenediamine was used as a hardener, the resultnig resin possessed an adhesive strength at room temperature of 200 to 250 kg./cm.² tested as in Examples 7, 8 and 9.

What is claimed is:

1. A method for preparing heat resistive epoxy resin comprising hardening epoxy resin derived from a polyhydric phenol and a compound selected from the group consisting of epihalohydrin and dihalohydrin, by admixing therewith a chelated phenolic compound as a hardening agent for the epoxy resin said chelated phenolic resin having the structural formula

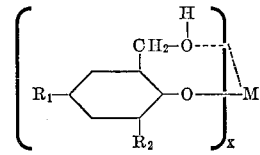

wherein $R_1$ is selected from the group consisting of nitro, sulpho, amino, halogen, allyl, alkyl and aryl and $R_2$ is selected from the same group plus methylol and X is an integer from 1 to 3 and M represents a polyvalent metal; said compound having been prepared by reacting an orthometholphenol with a salt of a polyvalent metal in the presence of an alkali and in aqueous solution.

2. The method of preparing heat resistive epoxy resin as claimed in claim 1 wherein instead of orthomethylolphenol a derivative of it is used in which one hydrogen atom combined to the nucleus is substituted by a radical selected from the group consisting of halogen, nitroamino, sulfon, methyl, ethyl, butyl, propyl and aryl.

3. The method of preparing heat resistive epoxy resin as claimed in claim 1 wherein the salt of polyvalent metal is a salt selected from the group consisting of chloride, sulfate, nitrate, phosphate, oxalate, and acetate salts.

4. The method of preparing heat resistive epoxy resin as claimed in claim 1 wherein the salt of polyvalent metal is zinc chloride.

5. A method for preparing heat resistive epoxy resin comprising glycidylating a chelated polyphenolic resin as defined in claim 1 with a compound selected from the group consisting of epihalogenhydrin and dihalogenhydrin, and hardening the product gained above by using a hardening agent with alkaline water solution.

6. The method of preparing a heat resistive epoxy resin as claimed in claim 5 wherein the chelated polyphenolic resin is prepared by reacting a phenolic resin of resol type with a salt of polyvalent metal in the presence of an alkaline aqueous solution.

7. The method for preparing heat resistive epoxy resin as claimed in claim 5 wherein the chelated polyphenolic resin is prepared by reacting a chelated phenolic resin with phenol.

8. The method for preparing heat resistive epoxy resin as claimed in claim 5 wherein the hardening agent is a compound selected from the group consisting of aromatic amines, aliphatic amines, polyamides and carboxylic acid anhydrides.

9. The method for preparing a metal containing heat resistant epoxy resin comprising adding a chelated phenolic resin as defined in claim 1 to a compound having at least one epoxy group and thereafter hardening the resulting product.

10. The method of claim 9 in which the chelated phenolic resin is prepared by reacting an o-methylol phenol with formaldehyde in the presence of an alkali and thereafter adding a solution of a polyvalent metal salt to the resulting resole product to form the chelated phenolic compound.

11. The method of claim 10 in which the chelated phenolic resin is reacted with an epihalohydrin.

12. The method of claim 10 in which the polyvalent metal salt is selected from the group consisting of nitrate, sulfate, phosphate, chloride, acetate and oxalate.

13. The method of claim 12 wherein the salt is a water soluble salt.

14. The epoxy resin prepared by the process of claim 1.

15. The epoxy resin prepared by the process of claim 1 wherein the polyvalent metal is zinc.

16. The process of claim 9 wherein there are 10–70 parts of metal chelated phenolic resin for each 100 parts of epoxy compound.

17. The method of claim 11 in which the reaction is effected at temperatures between 20° C. and 100° C. and in the presence of an alkali and the epoxy compound is epichlorhydrin.

18. The method of claim 11 in which the reaction is effected at temperatures between 60° C. and 100° C. and in the presence of an amine catalyst and the epoxy compound is epichlorhydrin.

References Cited by the Examiner

UNITED STATES PATENTS

| 2,738,339 | 3/1956 | Taylor | 260—47 |
| 2,837,493 | 6/1958 | Schlenker | 260—831 |
| 3,144,428 | 7/1964 | Kost | 260—831 |

MURRAY TILLMAN, *Primary Examiner.*

E. J. TROJNAR, P. LIEBERMAN, *Assistant Examiners.*